United States Patent
Poornachandran et al.

(10) Patent No.: US 12,063,280 B2
(45) Date of Patent: Aug. 13, 2024

(54) PROVENANCE AUDIT TRAILS FOR MICROSERVICES ARCHITECTURES

(71) Applicant: Intel Corporation, Santa Clara, CA (US)

(72) Inventors: Rajesh Poornachandran, Portland, OR (US); Vincent Zimmer, Issaquah, WA (US); Subrata Banik, Bangalore (IN); Marcos Carranza, Portland, OR (US); Kshitij Arun Doshi, Tempe, AZ (US); Francesc Guim Bernat, Barcelona (ES); Karthik Kumar, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 18/456,102

(22) Filed: Aug. 25, 2023

(65) Prior Publication Data

US 2023/0412699 A1 Dec. 21, 2023

Related U.S. Application Data

(63) Continuation of application No. 18/067,097, filed on Dec. 16, 2022, now Pat. No. 11,792,280, which is a
(Continued)

(51) Int. Cl.
*H04L 67/51* (2022.01)
*H04L 9/00* (2022.01)
(Continued)

(52) U.S. Cl.
CPC ............ *H04L 67/51* (2022.05); *H04L 9/3278* (2013.01); *H04L 41/5009* (2013.01); *H04L 67/562* (2022.05); *H04L 9/50* (2022.05)

(58) Field of Classification Search
CPC ... H04L 67/51; H04L 9/3278; H04L 41/5009; H04L 67/562; H04L 9/50
See application file for complete search history.

(56) References Cited

U.S. PATENT DOCUMENTS 10,484,341 B1 * 11/2019 Todd ................. G06F 9/45558
11,570,264 B1 1/2023 Poornachandran et al.
(Continued)

FOREIGN PATENT DOCUMENTS

| CN | 116305136 A | 6/2023 |
| EP | 4202739 A1 | 6/2023 |

OTHER PUBLICATIONS

Chinese Patent Application No. 202211588006.6 "Notice on Publication of Application of Patent for Invention" mailed Jun. 28, 2023, 2 pages (with translation), CNIPA.
(Continued)

*Primary Examiner* — Joe Chacko
(74) *Attorney, Agent, or Firm* — JAFFERY WATSON MENDONSA & HAMILTON LLP

(57) ABSTRACT

An apparatus to facilitate provenance audit trails for microservices architectures is disclosed. The apparatus includes one or more processors to obtain provenance metadata for a microservice from a local blockchain of provenance metadata maintained for the hardware resource executing a task performed by the microservice, the provenance metadata comprising identification of the microservice, operating state of at least one of a hardware resource or a software resource used to execute the microservice and the task, and an operating state of a sidecar of the microservice during the task; access one or more policies established for the microservice; analyze the provenance metadata with respect to the one or more policies to identify if there is a violation of the one or more policies; and generate one or more evaluation metrics based on whether the violation of the one or more policies is identified.

20 Claims, 9 Drawing Sheets

Related U.S. Application Data continuation of application No. 17/557,604, filed on Dec. 21, 2021, now Pat. No. 11,570,264.

(51) Int. Cl.
*H04L 9/32* (2006.01)
*H04L 41/5009* (2022.01)
*H04L 67/562* (2022.01)

(56) References Cited

U.S. PATENT DOCUMENTS

| | | | |
|---|---|---|---|
| 11,792,280 B2 | 10/2023 | Poornachandran et al. | |
| 2018/0337770 A1* | 11/2018 | Bathen | H04L 9/3239 |
| 2019/0281132 A1 | 9/2019 | Sethuraman et al. | |
| 2020/0329114 A1* | 10/2020 | Bahl | G06N 3/006 |
| 2021/0117249 A1 | 4/2021 | Doshi et al. | |
| 2022/0121461 A1* | 4/2022 | Yegneswaran | G06F 11/323 |
| 2023/0199077 A1 | 6/2023 | Poornachandran et al. | |

OTHER PUBLICATIONS

European Patent Application No. 22206984.1 "Extended European Search Report" mailed May 4, 2023, 12 pages.

European Patent Application No. 22206984.1 "Notification of European Publication Number and Information on the Application of Article 67(3) EPC" mailed Jun. 1, 2023, 2 pages, EPO.

Notice of Allowance, U.S. Appl. No. 17/557,604, Oct. 3, 2022, 9 pages, USPTO.

U.S. Appl. No. 18/067,097 "Notice of Allowance" mailed Jun. 7, 2023, 8 pages.

* cited by examiner

500

Obtain, by a microservice of a service hosted in a datacenter, provisioned credentials for the microservice based on an attestation protocol
510

For a task performed by the microservice, generate provenance metadata for the task, the provenance metadata including identification of the microservice, operating state of a hardware resource used to execute the microservice and the task, and operating state of the sidecar of the microservice during the task
520

Encrypt the provenance metadata with the provisioned credentials for the microservice using additive homomorphic encryption
530

Record the encrypted provenance metadata in a local blockchain of provenance metadata maintained for the hardware resource executing the task and the microservice
540

Cause the local blockchain of provenance metadata to be available in a trust broker along with other blockchain of provenance metadata for the service
550

Access a log of provenance metadata for a service, the log of provenance metadata comprising provenance metadata generated by microservices of the service, the provenance metadata homomorphically encrypted and recorded in a blockchain
565

Decrypt at least a portion of the provenance metadata
570

Access one or more policies established for the service, the one or more policies including service level agreements (SLAs) for the service including QoS and SLOs
575

Analyze the portion of the provenance metadata with respect to the one or more policies to identify if there is a violation of the one or more policies
580

Generate evaluation metrics based on whether the violation of the one or more policies is identified
585

*FIG. 5B*

PROVENANCE AUDIT TRAILS FOR MICROSERVICES ARCHITECTURES

RELATED APPLICATIONS

This application claims the benefit of priority from and is a continuation of U.S. patent Ser. No. 18/067,097 filed on Dec. 16, 2022, now U.S. Pat. No. 11,792,280, which is a continuation of U.S. patent application Ser. No. 17/557,604 filed on Dec. 21, 2021, now U.S. Pat. No. 11,570,264, the full disclosures of which are incorporated herein by reference.

FIELD

Embodiments relate generally to data processing and more particularly to provenance audit trails for microservices architectures.

BACKGROUND OF THE DESCRIPTION

Datacenters often leverage a microservice architecture to provide for network infrastructure services. A microservice architecture can arrange an application as a collection of loosely-coupled microservices. Microservices can refer to processes that communicate over a network to fulfill a goal using technology-agnostic protocols. In some cases, the microservices may be deployed using a container orchestration platform providing containerized workloads and/or services. The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization. The microservices deployment model provided by the service mesh is becoming increasingly elastic, providing flexibility to scale up and scale down microservices.

In a service mesh environment, a typical worker node in a compute cluster can handle hundreds of container workloads at the same time. These worker nodes may also have statically-attached specialized hardware accelerators optimized for compute intensive tasks. For instance, a class of hardware accelerators can be optimized to efficiently run cryptography and compression algorithms, or to run machine-learning acceleration algorithms. Such hardware accelerators may be provided as a form of disaggregated computing, where the workloads are distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

The microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices. As such, it is becoming increasingly difficult to provide a secure audit trail for confirming provenance and maintaining security and confidentiality in the service mesh.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 5A is a flow diagram illustrating an embodiment of a method for facilitating provenance audit trails for microservices architectures.

FIG. 5B is a flow diagram illustrating an embodiment of a method for enabling evaluation of service policies using provenance audit trails for microservices architectures.

DETAILED DESCRIPTION

Figure 1:
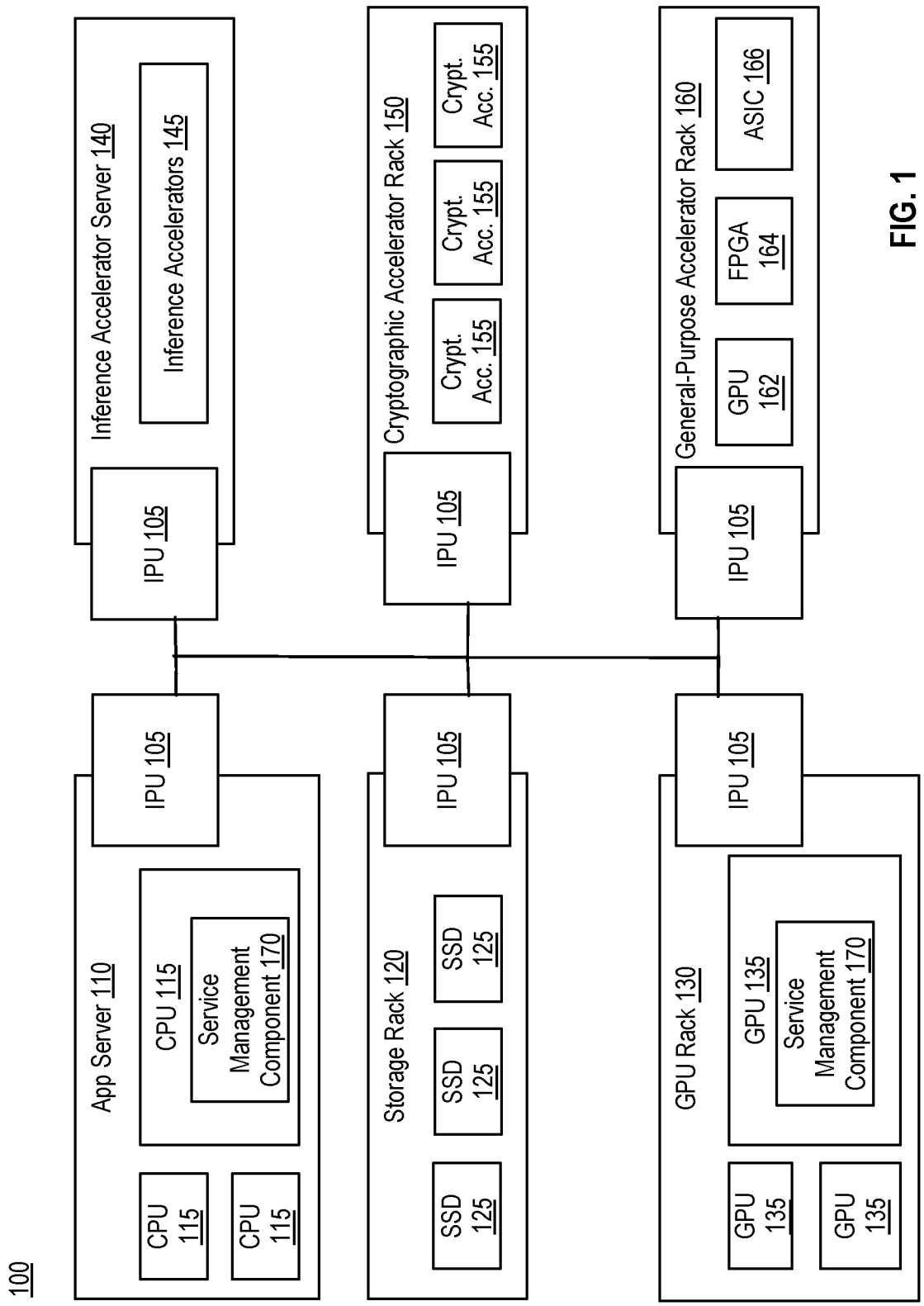
FIG. 1 illustrates a datacenter system that provides for provenance audit trails for microservices architectures, in accordance with implementations herein.

Implementations of the disclosure describe provenance audit trails for microservices architectures.

Cloud service providers (CSPs) are deploying solutions in datacenters where processing of a workload is distributed on various compute resources, such as central processing units (CPUs), graphics processing units (GPUs), and/or hardware accelerators (including, but not limited to, GPUs, field programmable gate arrays (FPGAs), application-specific integrated circuits (ASICs), cryptographic accelerators, compression accelerators, and so on). Traditionally, these compute resources were running on the same platform and connected via physical communication links, such as peripheral component interconnect express (PCIe).

However, disaggregated computing is on the rise in data centers. With disaggregated computing, CSPs are deploying solutions where processing of a workload is distributed on disaggregated compute resources, such as CPUs, GPUs, and hardware accelerators (including FPGAs, ASICs, etc.), that are connected via a network instead of being on the same platform and connected via physical links such as PCIe. Disaggregated computing enables improved resource utilization and lowers ownership costs by enabling more efficient use of available resources. Disaggregated computing also enables pooling a large number of hardware accelerators for large computation making the computation more efficient and better performing.

Hardware accelerators (also referred to herein as a hardware accelerator resources, hardware accelerator devices, accelerator resource, accelerator device, and/or extended resource) as discussed herein may refer to any of special-purpose central processing units (CPUs), graphics processing units (GPUs), general purpose GPUs (GPGPUs), field programmable gate arrays (FPGAs), application-specific integrated circuits (ASICs), inference accelerators, cryptographic accelerators, compression accelerators, other special-purpose hardware accelerators, and so on.

Moreover, the datacenters used by CSPs to deploy a service mesh often leverage a microservice architecture to provide for network infrastructure services of the service mesh. A microservice architecture can arrange an application as a collection of loosely-coupled microservices. The microservices may be the processes that communicate over a network to fulfill a goal using technology-agnostic protocols. In some cases, the microservices can be deployed using a container orchestration platform providing containerized workloads and/or services. In some examples, the service may be a large service comprising hundreds of microservices working in conjunction with each other or may be a modest individual service. A workload may refer to a resource running on the cloud consuming resources, such as computing power. In some embodiments, an application, service, or microservice may be referred to as a workload, which denotes the workload can be moved around between different cloud platforms or from on-premises to the cloud or vice-versa without any dependencies or hassle.

The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

As previously noted, the microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices (e.g., intellectual property core or block (IPs), heterogeneous processing units (XPUs)). As such, it is becoming increasingly difficult to provide a secure audit trail for confirming provenance and maintaining security and confidentiality in the service mesh.

This especially apparent on conventional systems that lack a capability to provide a robust and accurate provenance audit trail. "Provenance" as used herein may refer to a chronology of the ownership, custody, or location of a historical object. Similarly, an audit trail may refer to a series of records of computer events, about an operating system, an application, or user activities. A computer system may have several audit trails, each devoted to a particular type of activity. Auditing is a review and analysis of management, operational, and technical controls. With respect to conventional service meshes deploying microservice architectures, such conventional service meshes lack a capability to provide metadata that travels with compute communications (e.g., remote procedure call (RPC) inter-process communications) to enable a secure audit trail for provenance, IP confidentiality, micro-payments, and so on. Furthermore, conventional systems lack proper revocation, on-boarding, and off-boarding based on a provenance reputation score.

Implementations of the disclosure address the above-noted technical drawbacks by providing for provenance audit trails for microservices architectures. In implementations herein, techniques are provided for generating provenance metadata for transactions performed by microservices of a service managed by a service mesh. Interchangeable compute kernels (which includes different blocks of compute nodes and/or on different XPUs) can run multiple microservices. In implementations herein, these microservices can be monitored/tracked using a secure audit trail generated from provenance metadata. The provenance metadata can be generated based on the telemetry metadata collected from transactions of the microservices including the data at rest, motion and in compute across heterogenous XPU blocks (including software stack). The provenance metadata can be homomorphically encrypted and tracked via blockchain in an example embodiment.

In implementations herein, a controller can enforce one or more provisioned policies for the microservices during run-time of the service based on the generated provenance metadata. An evaluator performs checks on the controller using a secure audit trail generated from the provenance metadata. The controller and the evaluator may be part of a trusted execution environment (TEE) to provide for secure and confidential computing. For example, the evaluator may perform a check on any hardware or software instances being proposed by the controller to determine that such proposed hardware or software instance is meeting the provisioned policies for the microservice. The evaluator may utilize evaluation metrics to provide feedback to the controller in terms of whether the controller is enforcing provisioned policies correctly based on the evaluated audit trail generated from provenance metadata.

Implementations of the disclosure provide technical advantages over the conventional approaches discussed above. One technical advantage is that implementations provide for improved provenance tracking in microservices architectures. For example, implementations herein provide for provenance tracking that enables auditability, secure revocation, XPU and microservices on-boarding/off-boarding management, improved IP confidentiality, and so on. Furthermore, implementations herein provide a fine-grained control mechanism in terms of how provenance data is tracked across heterogenous components (e.g., hardware components, software components, microservices) of the service and that is policy configurable. This can help to address tradeoffs in terms of performance versus provenance.

FIG. 1 illustrates a datacenter system 100 that provides for provenance audit trails for microservices architectures, in accordance with implementations herein. Datacenter system 100 illustrates an example data center (for example, hosted by a cloud service provider (CSP)) providing a variety of XPUs (heterogeneous processing units) for processing tasks at the datacenter, where an XPU can include one or more of: a central processing unit (CPU) 115, a graphics processing unit (GPU) 135 (including a general purpose GPU (GPGPU), ASICs, or other processing units (e.g., accelerators 145, 155, 166, inference accelerators 145, cryptographic accelerators 155, programmable or fixed function FPGAs 164, application-specific integrated circuit (ASICs) 166, compression accelerators, and so on). The datacenter may also provide storage units for data storage tasks, as well. The storage units may include solid state drive (SSD) 125, for example. The XPUs and/or storage units may be hosted with similar-type units (e.g., CPUS 115 hosted on an application server (app server) 110, SSDs 125 hosted on a storage rack 120, GPUs 135 hosted on a GPU rack 130, inference accelerators 145 hosted on an inference accelerator server 140, cryptographic accelerators 155 hosted on a cryptographic accelerator rack 150, and general-purpose accelerators 162, 164, 166 hosted on accelerator rack 160.

The datacenter of system 100 provides its hosted processing components 115, 125, 135, 145, 155, 162, 164, 166 with a variety of offloads using, for example, IPUs 105 that are directly attached to the respective host processing component. Although IPUs 105 are discussed for example purposes, other programmable network devices, such as DPUs or SmartNICs, may be used interchangeable for IPUs 105 herein. The offloads provided may be networking, storage, security, etc. This allows the processing components 115, 125, 135, 145, 155, 162, 164, 166 to run without a hypervisor, and provides CSPs the capability of renting out the host in a datacenter to their security-minded customers, or avoid cross-talk and other problems associated with multi-tenant hosts.

An IPU 105 can provide a role in data centers by providing the datacenter operator, such as a Cloud Service Provider (CSP), a control point for security, acceleration, telemetry and service orchestration. IPU 105 architecture may build upon existing Smart Network Interface Card (SmartNIC) features and is a part of controlling security and data acceleration within and across distributed platforms. It is a secure domain controlled by CSPs for managing a platform, providing services to tenants, and securing access into the data center network. The IPU 105 increases the performance and predictability for distributed runtimes and enables scaling to multi-terabit throughputs by offloading host services, reliable transport, and optimizing data copies.

IPUs 105 have grown in complexity over the years, starting with foundational NICs, whose sole purpose was to get packets into the host and out of it. With the addition of networking software offload, the NICs evolved to become SmartNICs, that are capable of offloading functions, such as VSwitch, VIRTIO-Net, AVF, etc. Remote disaggregated storage architectures provide a further evolution, where compute and storage are not co-located anymore, but large compute clusters are connected to large storage clusters over the network. Increase in network speeds, and evolution of protocols made this a possibility. One of the advantages that remote disaggregated storage offers over direct attached storage is that compute and memory can be developed and updated at different cadences. The amount of memory that is attached to a compute node is not limited by physical addition or removal of hard-drives anymore, but can be hot-plugged as a PF to a PCIe Switch. Technologies such as Smart End Point enable IPUs to have firmware-controlled switches, along the PCIe Switch itself to not be limited by hardware implementations.

As discussed above, embodiments herein provide for provenance audit trails for microservices architectures. In one implementation, datacenter system 100 includes one or more resources that can implement service management component 170 to provide the provenance audit trails for microservices architectures. For illustrative example purposes, service management component 170 is shown in the CPU 115 and GPU 135, respectively, of datacenter system 100. However, service management component 170 may operate in one or more of the various other disaggregated resources of datacenter system 100 in accordance with implementations herein. As such, the resources of datacenter system 100 may be in different platforms connected via a network (not shown) in the datacenter system 100. In some implementations, software and/or middleware can cause the resources of datacenter system 100 to logically appear to be in the same platform. Furthermore, transport protocols implemented in software and/or hardware (e.g., network interface cards (NICs)) can make the remote resources logically appear as if they are local resources as well.

Further details of the service management component 170 implementing the provenance audit trails for microservices architectures is described below with respect to FIGS. 2-6.

Figure 2:
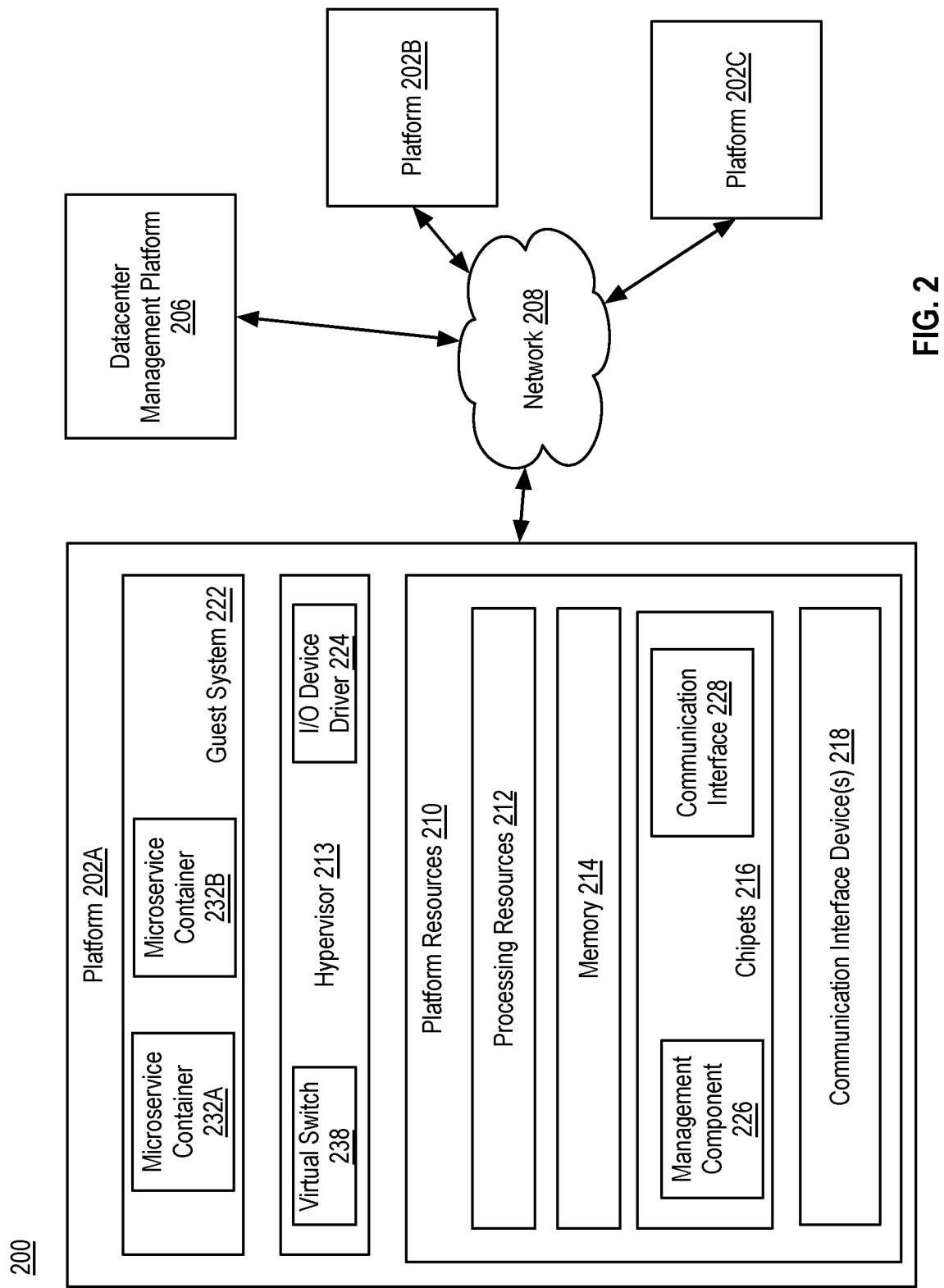
FIG. 2 illustrates a block diagram of components of a computing platform in a datacenter system, according to implementations herein.

FIG. 2 illustrates a block diagram of components of a computing platform 202A in a datacenter system 200, according to implementations herein. In the embodiment depicted, platforms 202A, 202B, and 202C (collectively referred to herein as platforms 202), along with a datacenter management platform 206 are interconnected via a network 208. In other embodiments, a computer system may include any suitable number of (i.e., one or more) platforms. In some embodiments (e.g., when a computer system includes a single platform), all or a portion of the datacenter management platform 206 may be included on a platform 202.

A platform 202 may include platform resources 210 with one or more processing resources 212 (e.g., XPUs including CPUs, GPUs, FPGAs, ASICs, other hardware accelerators), memories 214 (which may include any number of different modules), chipsets 216, communication interface device(s) 218, and any other suitable hardware and/or software to execute a hypervisor 213 or other operating system capable of executing workloads associated with applications running on platform 202.

In some embodiments, a platform 202 may function as a host platform for one or more guest systems 222 that invoke these applications. Platform 202A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof.

Each platform 202 may include platform resources 210. Platform resources 210 can include, among other logic enabling the functionality of platform 202, one or more processing resources 212 (such as CPUs, GPUs, FPGAs, other hardware accelerators, etc.), memory 214, one or more chipsets 216, and communication interface(s) 228. Although three platforms are illustrated, computer platform 202A may be interconnected with any suitable number of platforms. In various embodiments, a platform 202 may reside on a circuit board that is installed in a chassis, rack, or other suitable structure that comprises multiple platforms coupled together through network 208 (which may comprise, e.g., a rack or backplane switch).

In the case of processing resources 212 comprising CPUs, the CPUs may each comprise any suitable number of processor cores and supporting logic (e.g., uncores). The cores may be coupled to each other, to memory 214, to at least one chipset 216, and/or to a communication interface device 218, through one or more controllers residing on the processing resource 212 (e.g., CPU) and/or chipset 216. In some embodiments, a processing resource 212 is embodied within a socket that is permanently or removably coupled to platform 202A. A platform 202 may include any suitable number of processing resources 212.

Memory 214 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 214 may be used for short, medium, and/or long term storage by platform 202A. Memory 214 may store any suitable data or information utilized by platform resources 210, including software embedded in a computer readable medium, and/or encoded logic incorporated in hardware or otherwise stored (e.g., firmware). Memory 214 may store data that is used by cores of processing resources 212. In some embodiments, memory 214 may also comprise storage for instructions that may be executed by the processing resources 212 (e.g., cores of CPUs) or other processing elements (e.g., logic resident on chipsets 216) to provide functionality associated with the management component 226 or other components of platform resources 210.

A platform 202 may also include one or more chipsets 216 comprising any suitable logic to support the operation of the processing resources 212. In various embodiments, chipset 216 may reside on the same die or package as a processing resource 212 or on one or more different dies or packages. Each chipset may support any suitable number of processing resources 212. A chipset 216 may also include one or more controllers to couple other components of platform resources 210 (e.g., communication interface 228 or memory 214) to one or more processing resources 212.

In the embodiment depicted, each chipset 216 also includes a management component 226. Management component 226 may include any suitable logic to support the operation of chipset 216. In a particular embodiment, a management component 226 can collect real—time telemetry data from the chipset 216, the processing resources 212, and/or memory 214 managed by the chipset 216, other components of platform resources 210, and/or various connections between components of platform resources 210.

Chipsets 216 also each include a communication interface 228. Communication interface 228 may be used for the communication of signaling and/or data between chipset 216 and one or more I/O devices, one or more networks 208, and/or one or more devices coupled to network 208 (e.g., datacenter management platform 206). For example, communication interface 228 may be used to send and receive network traffic such as data packets. In a particular embodiment, a communication interface 228 comprises one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), FibreChannel, InfiniBand, Wi-Fi, or other suitable standard. A NIC may include one or more physical ports that may couple to a cable (e.g., an Ethernet cable). A NIC may enable communication between any suitable element of chipset 216 (e.g., management component 226) and another device coupled to network 208. In various embodiments, a NIC may be integrated with the chipset 216 (i.e., may be on the same integrated circuit or circuit board as the rest of the chipset logic) or may be on a different integrated circuit or circuit board that is electromechanically coupled to the chipset.

Platform resources 210 may include an additional communication interface device(s) 228. Similar to communication interface 218, communication interfaces device(s) 228 may be used for the communication of signaling and/or data between platform resources 210 and one or more networks 208 and one or more devices coupled to the network 208. For example, communication interface device(s) 228 may be used to send and receive network traffic such as data packets. In a particular embodiment, communication interface device(s) 228 comprise one or more physical NICs. These NICs may enable communication between any suitable element of platform resources 210 (e.g., processing resources 212 or memory 214) and another device coupled to network 208 (e.g., elements of other platforms or remote computing devices coupled to network 208 through one or more networks).

Platform resources 210 may receive and perform any suitable types of workloads. A workload may include any request to utilize one or more resources of platform resources 210, such as one or more cores or associated logic. For example, a workload may comprise a request to instantiate a software component, such as an I/O device driver 224 or guest system 222; a request to process a network packet received from a microservices container 232A, 232B (collectively referred to herein as microservice containers 232) or device external to platform 202A (such as a network node coupled to network 208); a request to execute a process or thread associated with a guest system 222, an application running on platform 202A, a hypervisor 213 or other operating system running on platform 202A; or other suitable processing request.

A microservice container 232 may emulate a computer system with its own dedicated hardware. A container 232 may refer to a standard unit of software that packages up code and all its dependencies, so the application runs quickly and reliably from one computing environment to another. A container image is a lightweight, standalone, executable package of software that includes components used to run an application: code, runtime, system tools, system libraries and settings. Containers 232 take advantage of a form of operating system (OS) virtualization in which features of the OS are leveraged to both isolate processes and control the amount of CPU, memory, and disk that those processes have access to.

When implementing containers 232, hypervisor 213 may also be referred to as a container runtime. Although implementations herein discuss virtualization of microservice functionality via containers, in some implementations, virtual machines may be hosted by hypervisor 213 and utilized to host microservices and/or other components of a service provided by an application.

A hypervisor 213 (also known as a virtual machine monitor (VMM)) may comprise logic to create and run guest systems 222. The hypervisor 213 may present guest operating systems run by virtual machines with a virtual operating platform (i.e., it appears to the virtual machines that they are running on separate physical nodes when they are actually consolidated onto a single hardware platform) and manage the execution of the guest operating systems by platform resources 210. Services of hypervisor 213 may be provided by virtualizing in software or through hardware-assisted resources that utilize minimal software intervention, or both. Multiple instances of a variety of guest operating systems may be managed by the hypervisor 213. Each platform 202 may have a separate instantiation of a hypervisor 213.

In implementations herein, the hypervisor 213 may also be implemented as a container runtime environment capable of building and containerizing applications.

Hypervisor 213 may be a native or bare-metal hypervisor that runs directly on platform resources 210 to control the platform logic and manage the guest operating systems. Alternatively, hypervisor 213 may be a hosted hypervisor that runs on a host operating system and abstracts the guest operating systems from the host operating system. Hypervisor 213 may include a virtual switch 238 that may provide virtual switching and/or routing functions to virtual machines of guest systems 222.

Virtual switch 238 may comprise a software element that is executed using components of platform resources 210. In various embodiments, hypervisor 213 may be in communication with any suitable entity (e.g., a SDN controller) which may cause hypervisor 213 to reconfigure the parameters of virtual switch 238 in response to changing conditions in platform 202 (e.g., the addition or deletion of microservice containers 232 or identification of optimizations that may be made to enhance performance of the platform).

The elements of platform resources 210 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus, to name a few examples.

Elements of the computer platform 202A may be coupled together in any suitable manner such as through one or more networks 208. A network 208 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

In implementations herein, one or more of processing resources 212 and/or microservice containers 232 may provide a service management component (not shown), such as service management component 170 described with respect to FIG. 1. Further details of how the processing resources 212 and/or microservice containers 232 implement the service management component for providing provenance audit trails for microservices architectures are described below with respect to FIGS. 3A-6.

Figure 3A:
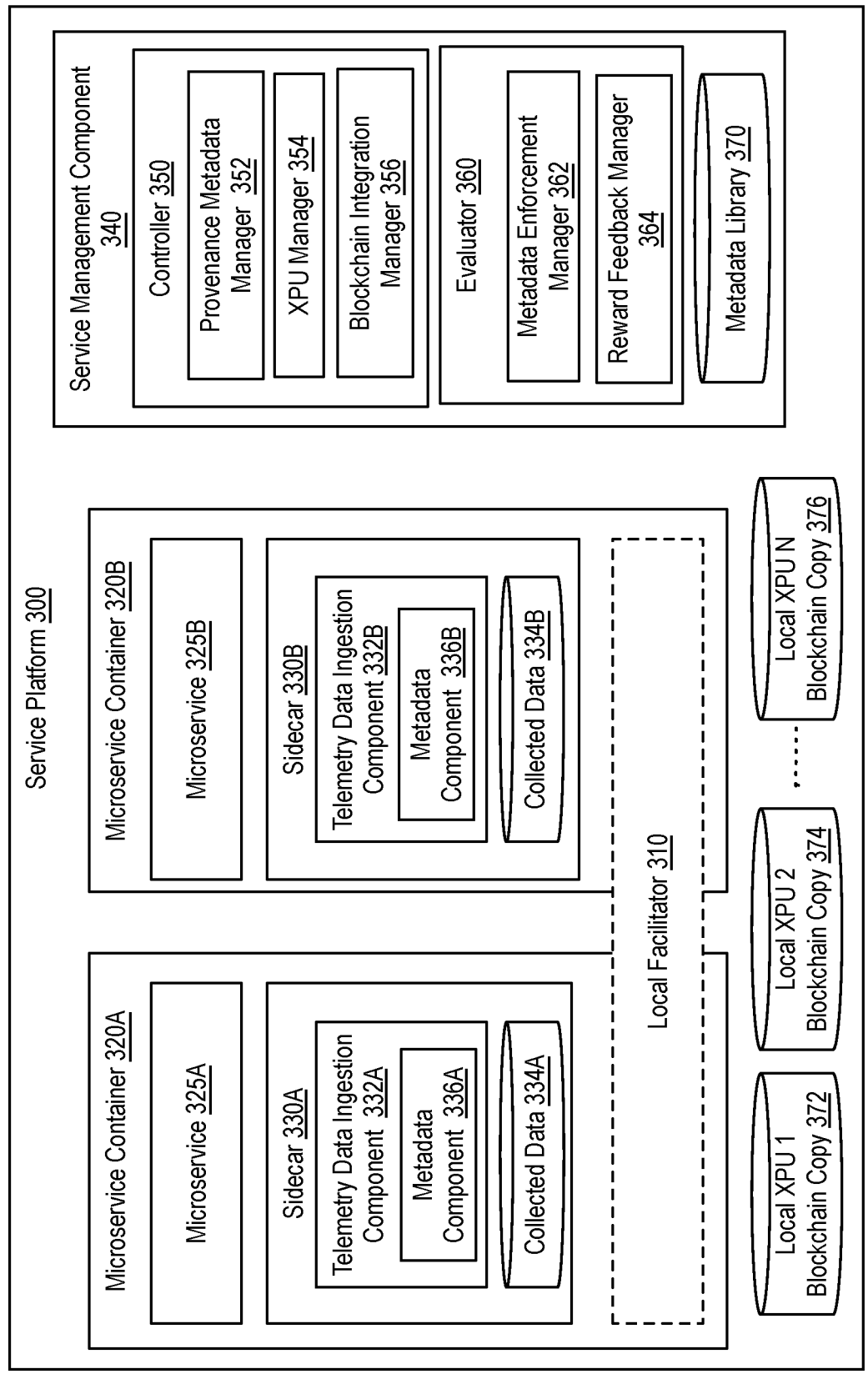
FIG. 3A is a block diagram of a service platform implementing provenance audit trails for microservices architectures, in accordance with implementations herein.

FIG. 3A is a block diagram of a service platform 300 implementing provenance audit trails for microservices architectures, in accordance with implementations herein. In one implementation, service platform 300 is the same as platform 202 of datacenter system 200 described with respect to FIG. 2. In some implementations, service platform 300 may be hosted in a datacenter that may or may not utilize disaggregated computing. Embodiments herein are not limited to implementation in disaggregated computing environments, and may be deployed across a large spectrum of different datacenter environments. The disaggregated computing datacenter system 200 of FIG. 2 is provided as an example implementation for service platform 300 and is not intended to limit embodiments herein.

In one implementation, service platform 300 may host a service implemented with one or more microservice containers 320A, 320B (collectively referred to herein as microservice container 320). Microservice containers 320 may be the same as microservice containers 232 described with respect to FIG. 2. The service may be orchestrated and manager using service management component 340. Service management component 340 may be implemented by hardware, software, firmware and/or any combination of hardware, software and/or firmware.

Service platform 300 may function as a host platform for a service, implementing deployed microservices of the service as one or more microservice containers 320 that invoke functionalities of the service. Service platform 300 may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof. In implementations herein, containers 320 may be implemented using hardware circuitry, such as one or more of a CPU, a GPU, a hardware accelerator, and so on. In one embodiment, containers 320 may be implemented using platform 202 described with respect to FIG. 2.

Microservices containers 320 may include logic to implement the functionality of the microservice 325A, 325B (collectively referred to herein as microservices 325) and a sidecar 330A, 330B (collectively referred to herein as sidecars 330. A sidecar 330 can be a container that runs on the same pod as the microservice 325. As depicted herein, sidecar 330 is illustrated as part of the microservice container 320, but sidecar 330 may be implemented as a separate container then microservice 325 functionality in some implementations.

A local facilitator 310 is connected to the sidecars 330 and can operate in a privileged space of the microservice containers 320. In one implementation, local facilitator 310 is a privileged daemon with access to low-level information. For example, local facilitator 310 has access to low-level software telemetry and hardware data, such as registries.

In implementations herein, sidecar 330 may include one or more components to support provenance audit trails for microservices architectures. These components can include telemetry data ingestion components 332A, 332B (collectively referred to herein as telemetry data ingestion component 332) and collected data 334A, 334B (data stores collectively referred to as collected data 334). Telemetry data ingestion components 332 may further include a metadata component 336A, 336B (collectively referred to herein as metadata component 336) to collect metadata associated with tasks executed by the microservice 325. The metadata collected by metadata component 336 may track provenance of which hardware device(s) (and/or IP blocks) and microservices operate on the task.

Figure 3B:
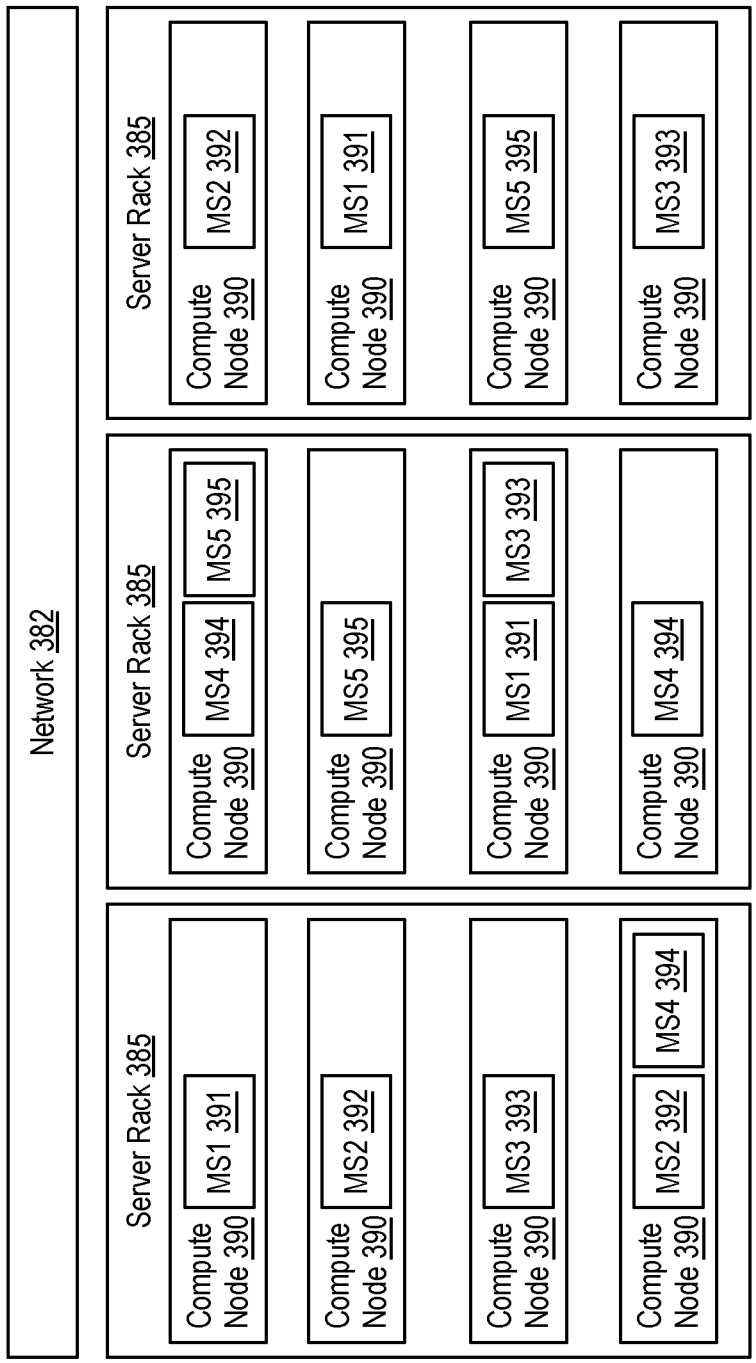
FIG. 3B illustrates an example datacenter hosting a plurality of server racks connected via a network, in accordance with implementations herein.

In implementations herein, there may be multiple microservices running in a data center that are running tasks capable of generating provenance metadata, such as the provenance metadata collected by metadata component 336. FIG. 3B illustrates an example datacenter 380 hosting a plurality of server racks 385 connected via a network 382, in accordance with implementations herein. In one implementation, service platform 300 of FIG. 3A is hosted by datacenter 380. Each server rack 385 may host multiple compute nodes 390. The compute nodes 390 may be one or more processing resources, such as XPUs including CPUs, GPUs, hardware accelerators, and so on. In one implementation, compute nodes 390 may include any one of processing components 115, 125, 135, 145, 155, 162, 164, 166 hosted in datacenter system 100 described with respect to FIG. 1. In one implementation, service platform 300 deploy one or more microservices in datacenter 380. As shown in FIG. 3B, microservices MS1 391, MS2 392, MS3 393, MS4 394, and MS5 395 are deployed and operating on compute nodes 390 in datacenter 380. In some implementations, MSs 391-395 may be associated with more than one service hosted in the datacenter 380. In implementations herein, each MS 391-395 may execute one or more tasks that can have associated provenance metadata generated for the task. The generation, collection, and processing of such provenance metadata is described in further detail below with reference back to FIG. 3A.

Referring back to FIG. 3A, service platform 300 also includes a service management component 340. Service management component 340 and its underlying sub-components may be implemented using hardware circuitry, such as one or more of a CPU, a GPU, a hardware accelerator, and so on. In one embodiment, service management component 340 may be implemented using platform 202 described with respect to FIG. 2. More generally, the example service management component 340 may be implemented by hardware, software, firmware and/or any combination of hardware, software and/or firmware. Thus, for example, the service management component 340 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In one implementation, service management component 340 operates to control management and/or orchestration of resources, such as microservices, for a service of a service mesh hosted by a datacenter, such as datacenter system 100 of FIG. 1. Service management component 340 may located at the same nodes or on a different node of microservice containers 320 in the service platform 300.

Service management component 340 may include one or more components to support provenance audit trails for microservices architectures. These components can include a controller 350, an evaluator 360, and a metadata library 370. In implementations herein, the controller 350 can host a provenance metadata manager 352, an XPU manager 354, and a blockchain integration manager 356. The evaluator can host a metadata enforcement manager 362 and a reward feedback manager 364.

In implementations herein, the service management component 340, including the controller 350, evaluator 360, and metadata library 370, may operate as part of a trusted execution environment (TEE) (not shown) generated by an underlying computing system(s) hosting the controller 350, evaluator 360, and metadata library 370. In some implementations, a subset of the service management components 340 may operate as part of the TEE. The TEE may be authenticated and protected from unauthorized access using hardware support of the underlying computing system(s). Illustratively, the TEE may be embodied as one or more secure enclaves established using Intel™ SGX technology. The TEE may also include or otherwise interface with one or more drivers, libraries, or other components of the underlying computing system(s) to interface with one or more other XPUs.

In implementations herein, the microservice containers 320 and service management component 340 provide for provenance audit trails for microservices architectures. In one implementation, the sidecar 330 for each microservice container 320 includes a telemetry data ingestion component 332 that receives telemetry data of the service platform 300 that is pertinent to the microservice 325. This telemetry data can include lower-level layers in the architecture (e.g., privileged space) and application (microservice 325) telemetry data and logs (e.g., user space). The collected data 334 is a data store that maintains this microservice-related telemetry data for the microservice 325. The metadata component 336 can generate and collect provenance metadata associated with tasks performed by the microservice 325. This provenance metadata may also be stored in collected data 334.

At the service management component 340, the controller 350 can manage the provenance metadata collection and utilization for a service. In one implementation, the provenance metadata manager 352 can cause the metadata components 336 to collect and store the provenance metadata for a microservice 325. For example, the provenance metadata manager 352 may cause platform credentials to be provisioned securely to a microservice 325 deployed for a service. Such platform credentials may be created during manufacturing (e.g., a physical unclonable function (PUF)) or platform readiness for the microservice 325. The platform credentials can be specific to the underlying processing resource (e.g., XPU such as a CPU, GPU, hardware accelerator, etc.) that is hosting and executing the microservice. The platform credentials can be provisioned securely via the TEE. In some implementations, the platform credentials may be provisioned by a baseboard management controller (BMC) and/or by a remote or local administrator.

Based on the provisioned credentials, during a discovery phase of the microservice 325, the microservice 325 can perform an attestation protocol with the controller 350. Once the microservice 325 is successfully attested, it is then allowed to participate in the provenance audit trail (e.g., tracking and service exposure) provided via the provenance metadata.

The provenance metadata manager 352 may orchestrate the provenance metadata collection process for a service and its deployed microservices 325 by instructing when and/or how a microservice 325 should collect provenance metadata corresponding to the tasks performed by the microservice. For example, the provenance metadata manager 352 instruct a microservice 325 to collect provenance metadata for all transactions (e.g., tasks) of the microservice, for a determined timeframe, for a determined snapshot of time, for transactions occurring in a determined geo-location, for determined types of transactions, and so on. As such, the provenance metadata tracking is a policy configurable option that can be controlled by the provenance metadata manager 352 in implementations herein.

Responsive to being notified to perform provenance metadata collection for a microservice 325, the sidecar 330 may utilize metadata component 336 to obtain telemetry metadata associated with the transaction. Such telemetry metadata may include identification of the microservice 325 processing the transaction, the communication from the sidecar 330, XPU compute utilization data, and/or XPU compute characteristics data. In one implementation, the sidecar 330 may manage these telemetry metadata elements differently (e.g., encrypting it using security HW features).

This telemetry data may then travel with an inter-process communication packet (e.g., RPC or gRPC communication) from the microservice 325.

In some implementations, the telemetry metadata that travel with RPC or gRPC invocation may also split and blend (n-furcate, join, etc.). As such, supporting structure creation and interpretation can be a service that is provided by the infrastructure to run across heterogeneous components (SW, SoC, device).

The provenance metadata manager 352 may then intercept this telemetry data and generate a provenance metadata structure for each transaction of the microservice 325. This provenance metadata structure may start with the base platform credentials provisioned for the microservice, and build on top those platform credentials with the telemetry metadata collected by metadata component 336. An example provenance metadata structure may be as follows:

```
Provenance_MetaData {
    On-boarded microservices_Ingredients,
    Off-boarded microservices Ingredients,
    Sidecar_Utilization,
    XPU_Compute_Utilization,
    XPU_Compute_Charactersitcs,
    Revoked uServices Ingredients,
};
```

In implementations herein, the provenance metadata manager 352 can securing the provenance metadata by applying homomorphic encryption. In one implementation, the provenance metadata manager 352 applies additive homomorphic encryption, which allows every layer to add their provenance data without looking into a previous layer of data. In some implementations, the provenance metadata manager 352 can then hash the encrypted provenance metadata with a platform ID, such as the provisioned platform credentials.

In implementations herein, the generated provenance metadata can be tracked via a distributed ledger, such as a blockchain. For example, controller 350 may utilize a blockchain integration manager 356 to record the provenance metadata in a blockchain that is available via a public ledger. Blockchain integration manager 356 can cause the provenance metadata to be recorded in a blockchain maintained for each hardware device hosting the microservice 325. For example, if microservice 325A is hosted by local XPU 1, then the provenance metadata generated by provenance metadata manager 352 from telemetry metadata of a transaction performed by microservice 325A could be stored to local XPU 1 blockchain copy 372, which can be a data store. Similarly, if microservice 325B is hosted by local XPU 2, then the provenance metadata generated by provenance metadata manager 352 from telemetry metadata of a transaction performed by microservice 325B could be stored to local XPU 2 blockchain copy 374, which can be a data store. Multiple local XPU blockchain copies for each XPU in the service platform 300 may be maintained (e.g., up to local XPU N blockchain copy 376). Secure provenance metadata tagging and tracking via a blockchain is discussed in further detail with respect to FIG. 4A.

Figure 4A:
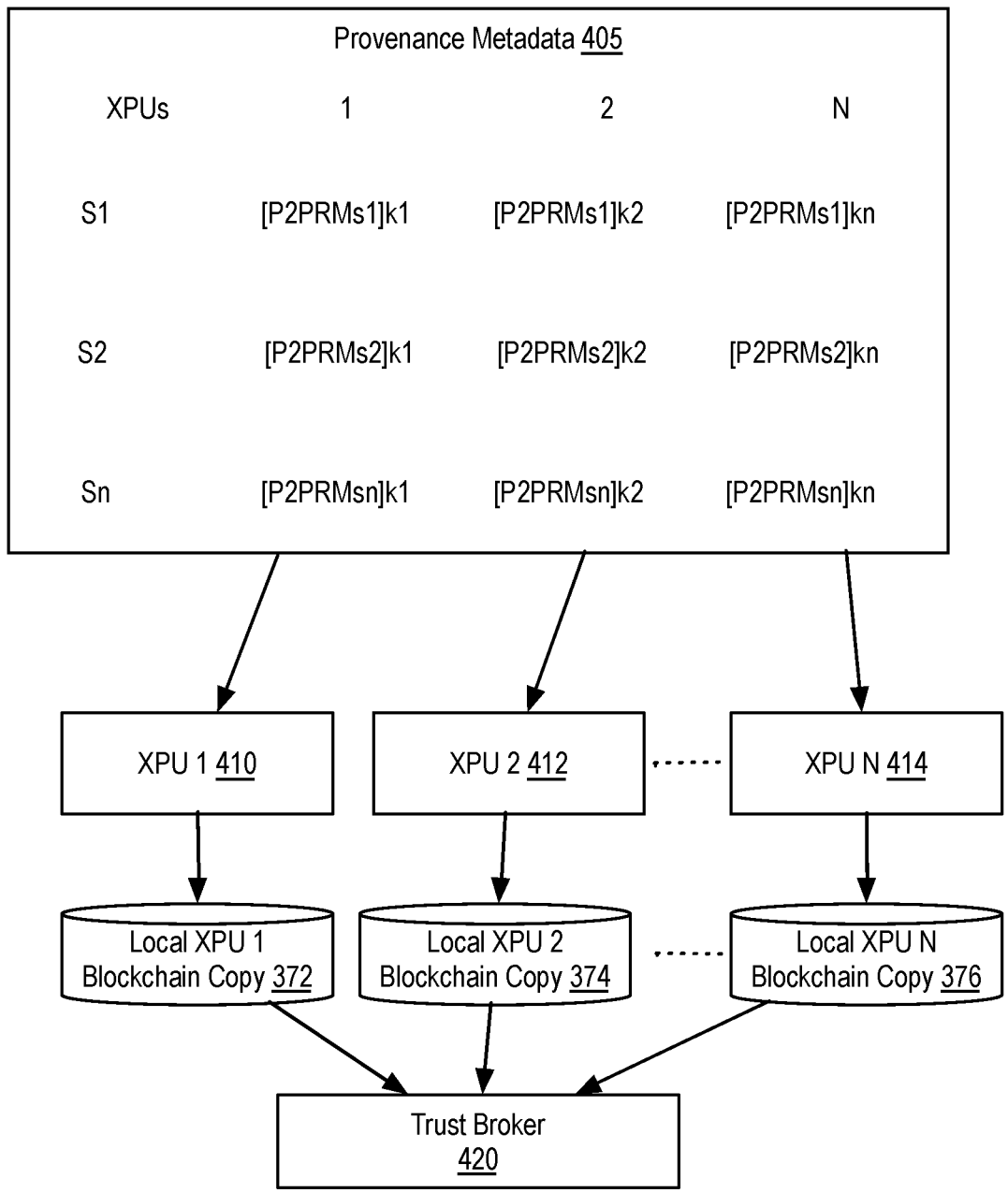
FIG. 4A is a block diagram depicting a blockchain system for secure provenance metadata tagging and tracking via a blockchain, in accordance with implementations herein.

FIG. 4A is a block diagram depicting a blockchain system 400 for secure provenance metadata tagging and tracking via a blockchain, in accordance with implementations herein. In one implementations, blockchain system 400 may be implemented in service platform 300 described with respect to FIG. 3A.

In one implementations, a plurality of provenance metadata 405 may be generated by multiple microservices, S1, S2, through Sn, operating on multiple XPUs 1, 2, through n. For example, microservice S1 may operation on XPUs 1-$n$ and generate provenance metadata 405 referred to as peer-to-peer resource management metadata (P2PRM) shown as P2PRMs1. Provenance metadata 405 is generated on each XPU for S1 and encrypted using a platform credential (k) provisioned for each XPU. As such, the provenance metadata for S1 includes [P2PRMs1]k1, [P2PRMs1]k2, through [P2PRMs1]kn. Similarly, provenance metadata 405 is generated by S2 through Sn and similarly depicted in FIG. 4A. The provenance metadata 405 generated by each microservice S1-Sn at each XPU 1-$n$, is stored recorded in a blockchain copy 372, 374, 376 (which may be the same as local XPU blockchain copies 372-376 described with respect to FIG. 3A) maintained for each XPU 1 410, XPU 2 412, through XPU n 414. The local blockchain copies 372, 374, 376 may then be made available via a public ledger through trust broker 420. As such, decentralized auditing of the provenance metadata 405 is made possible in implementations herein.

Referring back to FIG. 3A, in implementations herein, the generation and enablement of secure 'metadata' that travels with, for example the gRPC, allows for tracking of which IP block/microservices operate on what tasks, especially when heterogenous multiple services work in conjunction from different/competing vendors. In one implementations, the XPU manager 354 of controller 350 can provide for such traceability in terms of on-boarding and off-boarding and revocation management for the microservices of a service.

For example, the traces or secure metadata, beyond being secured, can have a certain attestation capability. For instance, if a service gets a trace of an execution of a micro-service with multiple RPC (e.g., gRPC) calls and multiple IP crosses, where each IP could potentially add secure and signed telemetry data. The signature could be potentially used by the SW stack to validate that each portion of the trace is generated by a trusted party. As such, this approach can contribute to determining that the data is not maliciously generated. In addition to mapping tasks and services onto vendor information based on run-time observations, implementations herein could utilize certain information to understand value metrics normalized to utilization on a per IP block basis. For example, IP block X: utilization: 30% missed latency SLA 40% of the time, and IP block Y: utilization 90%, missed latency SLA: 5%.

The evaluator 360 of service management component 340 can be utilized in implementations herein to supervise the secured provenance metadata with respect to provisioned policies of the service and take any responsive actions accordingly. In one implementation, metadata enforcement manager 362 can monitor the provenance metadata generated by controller 350 to determine whether the controller 350 is accurately enforcing policies provisioned for the service (and its microservices). The policies provisioned for the service can include service level agreements (SLAs) for the service including quality of service (QoS) metrics for the service (and its microservices) and service level objectives (SLOs) for the service (and its microservices). For example, the policies may indicate a level of confidentiality that should be maintained for data, classes of microservices that can work together, network protocols to be used, processing device specifications to be used, and so on.

The metadata enforcement manager 362 can access the provenance metadata via a metadata library, and/or from the blockchain copies maintained in local blockchain copies 372-376. In some implementations, the metadata enforcement manager 362 may decrypt at least a portion of the provenance metadata as part of the access. The metadata enforcement manager 362 may analyze the provenance metadata with respect to the policies provisioned for the microservice in order to identify whether there are any violations of the policies by the microservice. For example, when the XPU manager 354 on-board news microservices or off-boards existing microservices, the metadata enforcement manager 362 can examine the audit trail generated by the logged provenance metadata to determine whether such actions by the XPU manager 354 are in line with the provisioned policies for the microservice. The evaluation performed by metadata enforcement manager 362 can determine whether, when a service is on-boarded or off-boarded, there was any revocation management performed which was indicated to be used by the provisioned policies for the microservice.

A reward feedback manager 364 can generate evaluation metrics based on whether the violation of the one or more policies is identified. Additionally, ML based techniques can be applied for reward based future improvements. These evaluation metrics can act as a reward function that encourages positive behaviors from the controller 350 and discourages negative behaviors from the controller 350. As such, implementations herein provide a check and balances approach between the controller 350 and the evaluator 360.

Figure 4B:
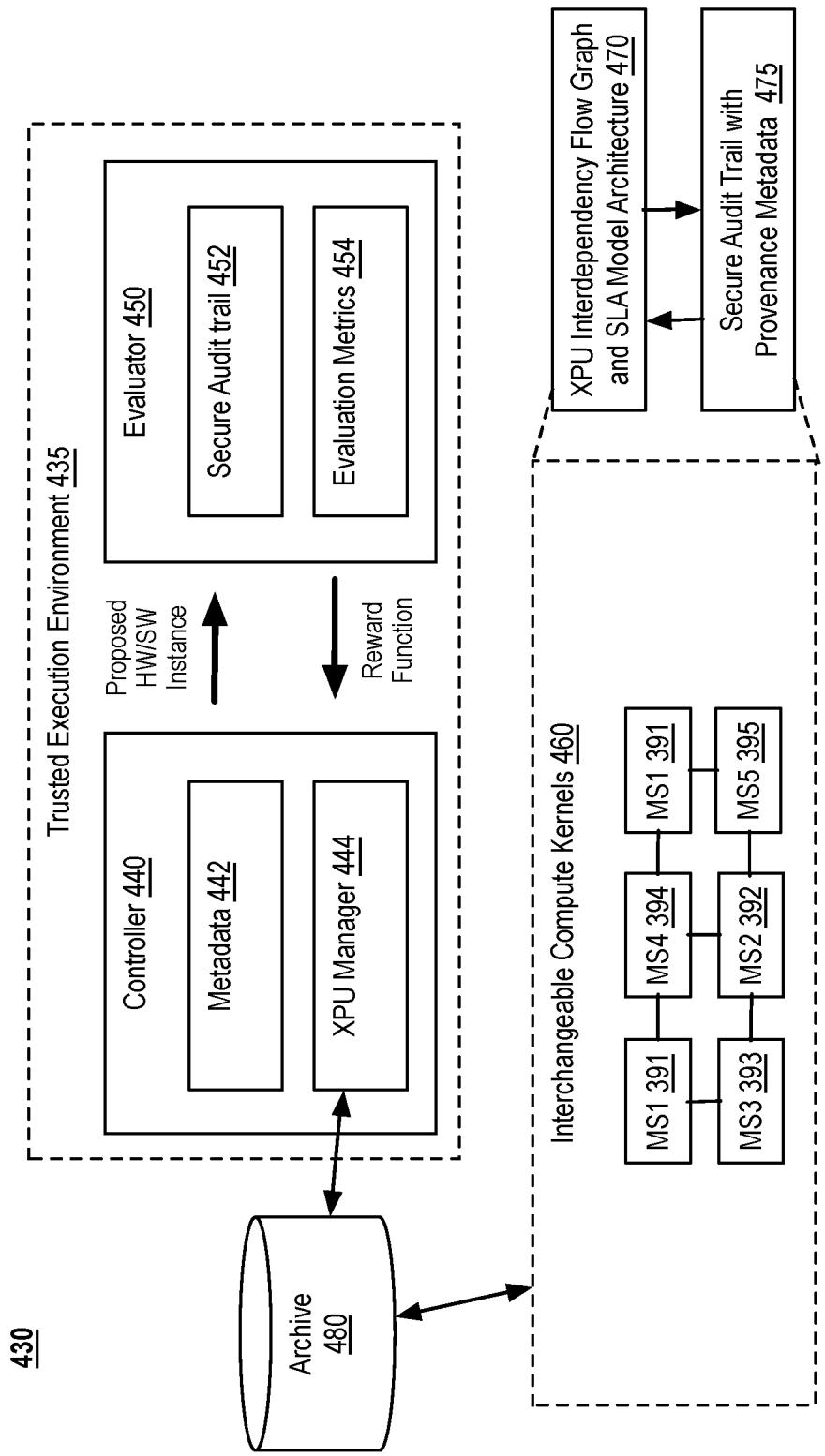
FIG. 4B is a diagram illustrating an operational schematic for provenance audit trails for microservices architectures, in accordance with implementations herein.

FIG. 4B is a diagram illustrating an operational schematic 430 for provenance audit trails for microservices architectures, in accordance with implementations herein. In one implementations, service management component 340 described with respect to FIG. 3A implements operational schematic 430.

Operational schematic 430 includes a TEE 435 hosting controller 440 and evaluator 450. In one implementation, controller 440 may be the same as controller 350 described with respect to FIG. 3A and evaluator 450 may be the same as evaluator 360 described with respect to FIG. 3A. Controller 440 may include metadata 442 and XPU manager 444, which may be the same as provenance metadata manager 352 and XPU manager 354, respectively, of FIG. 3A. Evaluator 450 may include secure audit trail 452 and evaluation metrics 454.

In implementations herein, interchangeable compute kernels 460 may include different blocks of compute nodes and/or on different XPUs which run multiple microservices, such as MS1-MS5 391-395. In one implementation, MS1-MS5 391-395 are the same as MS1-MS5 391-395 described with respect to FIG. 3B. These microservices MS1-MS5 391-395 may be part of an XPU interdependent glow graph and SLA model architecture 470 that is monitored using a secure audit trail 475 with provenance metadata, as described herein.

Utilizing the techniques described above with respect to FIG. 3A-4A, controller 440 may generate provenance metadata 442 based on the telemetry metadata stored in metadata topology archive 490. In implementations herein, the provenance metadata 442 may be homomorphic ally encrypted and tracked via blockchain as described above. An XPU manager 444 can enforce one or more provisioned policies (e.g., stored in archive 480) for the microservices MS1-MS5 391-395 during run-time of the service, based on the generated provenance metadata 442.

The evaluator 450 performs checks on the controller 440 using a secure audit trail 452 generated from the provenance metadata 442. For example, the evaluator 450 may perform a check on any hardware or software instances being proposed by the XPU manager 444 to determine that such proposed hardware or software instance is meeting the provisioned policies for the microservice. The evaluator 450 may utilize evaluation metrics 454 to provide feedback to the controller 440 in terms of whether the controller 440 is enforcing provisioned policies correctly based on the evaluated secure audit trail 452 generated from provenance metadata 442.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD—ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

FIG. 5A is a flow diagram illustrating an embodiment of a method 500 for facilitating provenance audit trails for microservices architectures. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing a sidecar in a microservice container, such as processing device executing a service management component 340 (which may be operating in a TEE) of service platform 300 of FIG. 3, may perform method 500.

The example process of method 500 of FIG. 5 begins at block 510 where a processing device may obtain, by a microservice of a service hosted in a datacenter including the processing device, provisioned credentials for the microservice based on an attestation protocol. At block 520, the processing device may generate, for a task performed by the microservice, provenance metadata for the task. In one implementation, the provenance metadata can include information such as identification of the microservice, operating state of a hardware resource and/or a software resource used to execute the microservice and the task, and operating state of the sidecar of the microservice during the task.

Subsequently, at block 530, the processing device may encrypt the provenance metadata with the provisioned credentials for the microservice using additive homomorphic encryption. Then, at block 540, the processing device may record the encrypted provenance metadata in a local blockchain of provenance metadata maintained for the hardware resource executing the task and the microservice. Lastly, at block 550, the processing device may cause the local blockchain of provenance metadata to be available in a trust broker along with other blockchain of provenance metadata for the service.

FIG. 5B is a flow diagram illustrating an embodiment of a method 560 for enabling evaluation of service policies using provenance audit trails for microservices architectures. Method 560 may be performed by processing logic that may comprise hardware (e.g., circuitry, dedicated logic, programmable logic, etc.), software (such as instructions run on a processing device), or a combination thereof. More particularly, the method 560 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 560 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing a sidecar in a microservice container, such as processing device executing a service management component 340 (which may be operating in a TEE) of service platform 300 of FIG. 3, may perform method 560.

The example process of method 560 of FIG. 5 begins at block 565 where the processing device may access a log of provenance metadata for a service. In one implementation, the log of provenance metadata can include provenance metadata generated by microservices of the service, where the provenance metadata is homomorphically encrypted and recorded in a blockchain. At block 570, the processing device may decrypt at least a portion of the provenance metadata.

Subsequently, at block 575, the processing device may access one or more policies established for the service, the one or more policies including service level agreements (SLAs) for the service including QoS and SLOs. Then, at block 580, the processing device may analyze the portion of the provenance metadata with respect to the one or more policies to identify if there is a violation of the one or more policies. Lastly, at block 585, the processing device may generate evaluation metrics based on whether the violation of the one or more policies is identified.

Figure 6:
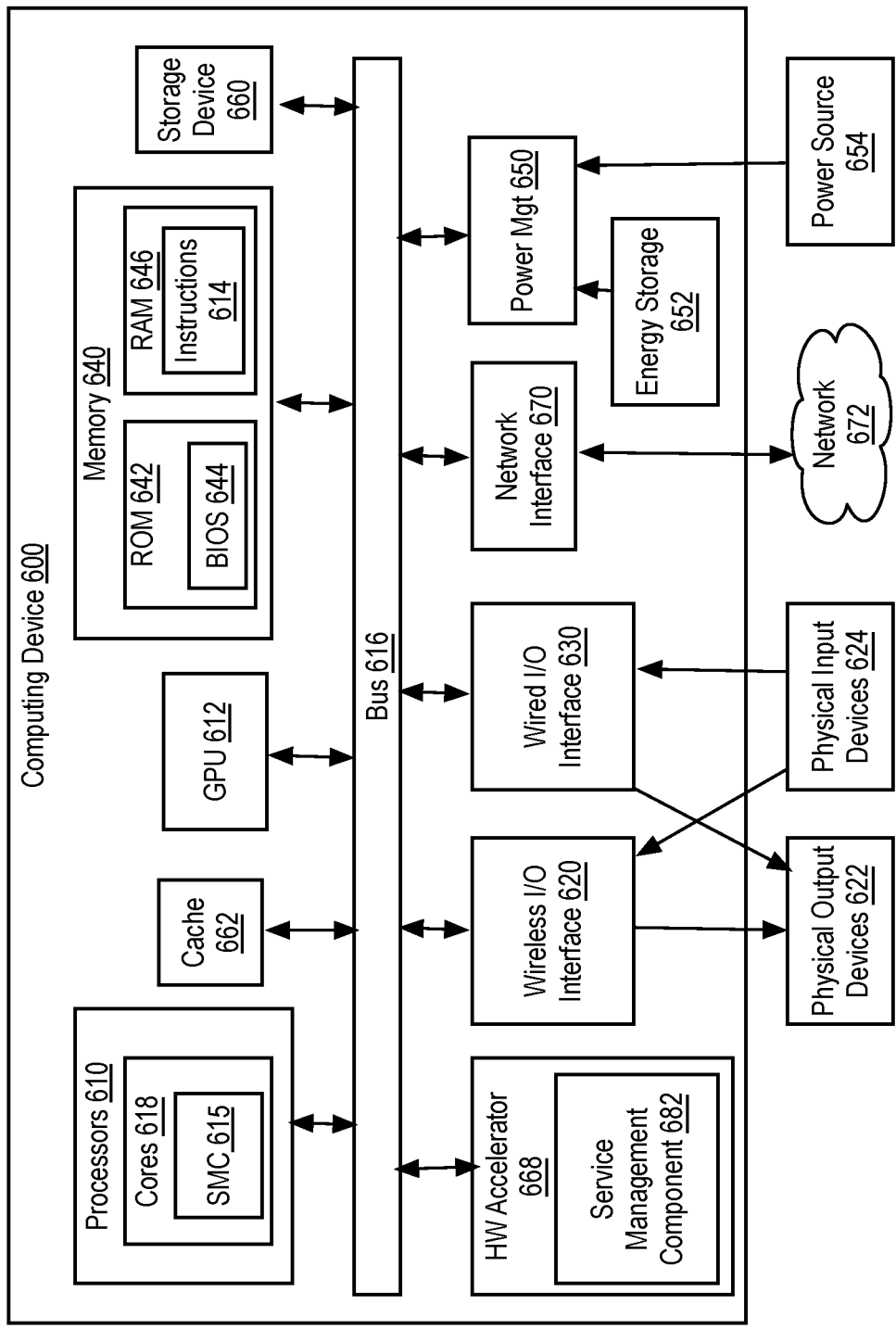
FIG. 6 is a schematic diagram of an illustrative electronic computing device to enable provenance audit trails for microservices architectures, according to some embodiments.

FIG. 6 is a schematic diagram of an illustrative electronic computing device 600 to enable provenance audit trails for microservices architectures, according to some embodiments. In some embodiments, the computing device 600 includes one or more processors 610 including one or more processors cores 618 including a service management component (SMC) 615, such as service management component 170, 340 described with respect to FIGS. 1 and 3A. In some embodiments, the one or more processor cores 618 establish a TEE to host the SMC 615. In some embodiments, the computing device 600 includes a hardware accelerator 668, the hardware accelerator including a service management component 682, such as service management component 170, 340 described with respect to FIGS. 1 and 3A. In some embodiments, the hardware accelerator 668 establishes a TEE to host the service management component 682. In some embodiments, the computing device is to provide provenance audit trails for microservices architectures, as provided in FIGS. 1-5B.

The computing device 600 may additionally include one or more of the following: cache 662, a graphical processing unit (GPU) 612 (which may be the hardware accelerator in some implementations), a wireless input/output (I/O) interface 620, a wired I/O interface 630, system memory 640 (e.g., memory circuitry), power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks are not described in further detail herein, as they can be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("Fire-Wire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

The following examples pertain to further embodiments. Example 1 is an apparatus to facilitate provenance audit trails for microservices architectures. The apparatus of Example 1 comprises one or more processors to: obtain, by a microservice of a service hosted in a datacenter, provisioned credentials for the microservice based on an attestation protocol; generate, for a task performed by the microservice, provenance metadata for the task, the provenance metadata including identification of the microservice, operating state of at least one of a hardware resource or a software resource used to execute the microservice and the task, and operating state of a sidecar of the microservice during the task; encrypt the provenance metadata with the provisioned credentials for the microservice; and record the encrypted provenance metadata in a local blockchain of provenance metadata maintained for the hardware resource executing the task and the microservice.

In Example 2, the subject matter of Example 1 can optionally include wherein the one or more processors are further to cause the local blockchain of provenance metadata to be available in a trust broker along with other blockchain of provenance metadata for the service. In Example 3, the subject matter of any one of Examples 1-2 can optionally include wherein the provenance metadata comprises a data structure comprising the identification of the microservice, the operating state of the at least one of the hardware resource or the software resource used to execute the microservice and the task, and operating state of the sidecar of the microservice during the task to the provisioned credentials for the microservice.

In Example 4, the subject matter of any one of Examples 1-3 can optionally include wherein the provisioned credentials comprise platform credentials for a hardware device used to execute the task performed by the microservice. In Example 5, the subject matter of any one of Examples 1~4 can optionally include wherein the platform credential comprise a physical unclonable function of the hardware device. In Example 6, the subject matter of any one of Examples 1-5 can optionally include wherein the one or more processors provide a trusted execution environment (TEE) for a controller of the service to generate the provenance metadata and to encrypt the provenance metadata.

In Example 7, the subject matter of any one of Examples 1-6 can optionally include wherein the one or more processors are further to: obtain the provenance metadata for the microservice from the local blockchain; access one or more policies established for the microservice; analyze the provenance metadata with respect to the one or more policies to identify if there is a violation of the one or more policies; and generate one or more evaluation metrics based on whether the violation of the one or more policies is identified. In Example 8, the subject matter of any one of Examples 1-7 can optionally include wherein the one or more policies comprise service level agreements (SLAs) for the microservice including one or more of quality of service (QoS) metrics and service level objectives (SLOs) for the microservice.

In Example 9, the subject matter of any one of Examples 1-8 can optionally include wherein the one or more processors are further to decrypt the provenance metadata that is obtained from the local blockchain. In Example 10, the subject matter of any one of Examples 1-9 can optionally include wherein the one or more processors to encrypt the provenance metadata comprises the one or more processors to apply additive homomorphic encryption to encrypt the provenance metadata.

Example 11 is a non-transitory computer-readable storage medium for facilitating provenance audit trails for microservices architectures. The non-transitory computer-readable storage medium of Example 11 having stored thereon executable computer program instructions that, when executed by one or more processors, cause the one or more processors to perform operations comprising: obtaining, by a microservice of a service hosted in a datacenter comprising the one or more processors, provisioned credentials for the microservice based on an attestation protocol; generating, for a task performed by the microservice, provenance metadata for the task, the provenance metadata including identification of the microservice, operating state of at least one of a hardware resource or a software resource used to execute the microservice and the task, and operating state of a sidecar of the microservice during the task; encrypting the provenance metadata with the provisioned credentials for the microservice; and recording the encrypted provenance metadata in a local blockchain of provenance metadata maintained for the hardware resource executing the task and the microservice.

In Example 12, the subject matter of Example 11 can optionally include wherein the operations further comprise causing the local blockchain of provenance metadata to be available in a trust broker along with other blockchain of provenance metadata for the service. In Example 13, the subject matter of Examples 11-12 can optionally include wherein the provenance metadata comprises a data structure comprising the identification of the microservice, the operating state of the at least one of the hardware resource or the software resource used to execute the microservice and the task, and operating state of the sidecar of the microservice during the task to the provisioned credentials for the microservice.

In Example 14, the subject matter of Examples 11-13 can optionally include wherein the operations further comprise providing a trusted execution environment (TEE) for a controller of the service to generate the provenance metadata and to encrypt the provenance metadata. In Example 15, the subject matter of Examples 11-14 can optionally include wherein the operations further comprise: obtaining the provenance metadata for the microservice from the local blockchain; accessing one or more policies established for the microservice; analyzing the provenance metadata with respect to the one or more policies to identify if there is a violation of the one or more policies; and generating one or more evaluation metrics based on whether the violation of the one or more policies is identified.

Example 16 is a method for facilitating provenance audit trails for microservices architectures. The method of Example 16 can include obtaining, by one or more processors hosting a microservice of a service, provisioned credentials for the microservice based on an attestation protocol; generating, for a task performed by the microservice, provenance metadata for the task, the provenance metadata including identification of the microservice, operating state of at least one of a hardware resource or a software resource used to execute the microservice and the task, and operating state of a sidecar of the microservice during the task; encrypting the provenance metadata with the provisioned credentials for the microservice; and recording the encrypted provenance metadata in a local blockchain of provenance metadata maintained for the hardware resource executing the task and the microservice.

In Example 17, the subject matter of Example 16 can optionally include further comprising causing the local blockchain of provenance metadata to be available in a trust broker along with other blockchain of provenance metadata for the service. In Example 18, the subject matter of Examples 16-17 can optionally include wherein the provenance metadata comprises a data structure comprising the identification of the microservice, the operating state of the at least one of the hardware resource or the software resource used to execute the microservice and the task, and operating state of the sidecar of the microservice during the task to the provisioned credentials for the microservice.

In Example 19, the subject matter of Examples 16-18 can optionally include further comprising providing a trusted execution environment (TEE) for a controller of the service to generate the provenance metadata and to encrypt the provenance metadata. In Example 20, the subject matter of Examples 16-19 can optionally include further comprising: obtaining the provenance metadata for the microservice from the local blockchain; accessing one or more policies established for the microservice; analyzing the provenance metadata with respect to the one or more policies to identify if there is a violation of the one or more policies; and generating one or more evaluation metrics based on whether the violation of the one or more policies is identified.

Example 21 is a system for facilitating provenance audit trails for microservices architectures. The system of Example 21 can optionally include a memory to store a block of data, and a processor communicably coupled to the memory to: obtain, by a microservice of a service hosted in a datacenter comprising the processor, provisioned credentials for the microservice based on an attestation protocol; generate, for a task performed by the microservice, provenance metadata for the task, the provenance metadata including identification of the microservice, operating state of at least one of a hardware resource or a software resource used to execute the microservice and the task, and operating state of a sidecar of the microservice during the task; encrypt the provenance metadata with the provisioned credentials for the microservice; and record the encrypted provenance metadata in a local blockchain of provenance metadata maintained for the hardware resource executing the task and the microservice.

In Example 22, the subject matter of Example 21 can optionally include wherein the one or more processors are further to cause the local blockchain of provenance metadata to be available in a trust broker along with other blockchain of provenance metadata for the service. In Example 23, the subject matter of any one of Examples 21-22 can optionally include wherein the provenance metadata comprises a data structure comprising the identification of the microservice, the operating state of the at least one of the hardware resource or the software resource used to execute the microservice and the task, and operating state of the sidecar of the microservice during the task to the provisioned credentials for the microservice.

In Example 24, the subject matter of any one of Examples 21-23 can optionally include wherein the provisioned credentials comprise platform credentials for a hardware device used to execute the task performed by the microservice. In Example 25, the subject matter of any one of Examples 21-24 can optionally include wherein the platform credential comprise a physical unclonable function of the hardware device. In Example 26, the subject matter of any one of Examples 21-25 can optionally include wherein the one or more processors provide a trusted execution environment (TEE) for a controller of the service to generate the provenance metadata and to encrypt the provenance metadata.

In Example 27, the subject matter of any one of Examples 21-26 can optionally include wherein the one or more processors are further to: obtain the provenance metadata for the microservice from the local blockchain; access one or more policies established for the microservice; analyze the provenance metadata with respect to the one or more policies to identify if there is a violation of the one or more policies; and generate one or more evaluation metrics based on whether the violation of the one or more policies is identified. In Example 28, the subject matter of any one of Examples 21-27 can optionally include wherein the one or more policies comprise service level agreements (SLAs) for the microservice including one or more of quality of service (QoS) metrics and service level objectives (SLOs) for the microservice.

In Example 29, the subject matter of any one of Examples 21-28 can optionally include wherein the one or more processors are further to decrypt the provenance metadata that is obtained from the local blockchain. In Example 30, the subject matter of any one of Examples 21-29 can optionally include wherein the one or more processors to encrypt the provenance metadata comprises the one or more processors to apply additive homomorphic encryption to encrypt the provenance metadata.

Example 30 is an apparatus for facilitating provenance audit trails for microservices architectures, comprising means for obtaining, via one or more processors hosting a microservice of a service, provisioned credentials for the microservice based on an attestation protocol; means for generating, for a task performed by the microservice, provenance metadata for the task, the provenance metadata including identification of the microservice, operating state of at least one of a hardware resource or a software resource used to execute the microservice and the task, and operating state of a sidecar of the microservice during the task; means for encrypting the provenance metadata with the provisioned credentials for the microservice; and means for recording the encrypted provenance metadata in a local blockchain of provenance metadata maintained for the hardware resource executing the task and the microservice. In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating provenance audit trails for microservices architectures, configured to perform the method of any one of Examples 16-20. Example 34 is an apparatus for facilitating provenance audit trails for microservices architectures, comprising means for performing the method of any one of claims 16 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
one or more processors to:
obtain provenance metadata for a microservice from a local blockchain of provenance metadata maintained for a hardware resource executing a task performed by the microservice, the provenance metadata comprising identification of the microservice, operating state of at least one of the hardware resource or a software resource used to execute the microservice and the task, and an operating state of a sidecar of the microservice during the task;
access one or more policies established for the microservice;
analyze the provenance metadata with respect to the one or more policies to identify if there is a violation of the one or more policies; and
generate one or more evaluation metrics based on whether the violation of the one or more policies is identified.

2. The apparatus of claim 1, wherein the one or more processors are further to cause the local blockchain of provenance metadata to be available in a trust broker along with other blockchain of provenance metadata for a service comprising the microservice.

3. The apparatus of claim 1, wherein the provenance metadata comprises a data structure comprising the identification of the microservice, the operating state of the at least one of the hardware resource or the software resource used to execute the microservice and the task, and operating state of the sidecar of the microservice during the task.

4. The apparatus of claim 1, wherein the provenance metadata is encrypted with provisioned credentials comprising platform credentials for a hardware device used to execute the task performed by the microservice.

5. The apparatus of claim 4, wherein the platform credentials comprise a physical unclonable function of the hardware device.

6. The apparatus of claim 1, wherein the one or more processors provide a trusted execution environment (TEE) for a controller of a service comprising the microservice to generate the provenance metadata and to encrypt the provenance metadata.

7. The apparatus of claim 1, wherein the provenance metadata is generated by the microservice by causing the one or more processors to:
obtain provisioned credentials for the microservice based on an attestation protocol;
generate, for the task, the provenance metadata for the task;
encrypt the provenance metadata with the provisioned credentials for the microservice; and
record the encrypted provenance metadata in the local blockchain.

8. The apparatus of claim 7, wherein the one or more policies comprise service level agreements (SLAs) for the micro service including one or more of quality of service (QoS) metrics and service level objectives (SLOs) for the microservice.

9. The apparatus of claim 1, wherein the one or more processors are further to decrypt the provenance metadata that is obtained from the local blockchain.

10. The apparatus of claim 1, wherein the one or more processors to encrypt the provenance metadata comprises the one or more processors to apply additive homomorphic encryption to encrypt the provenance metadata.

11. A method comprising:
obtaining, by one or more processors hosting a microservice of a service hosted in a datacenter, provenance metadata for the microservice from a local blockchain of provenance metadata maintained for a hardware resource executing a task performed by the microservice, the provenance metadata comprising identification of the microservice, operating state of at least one of the hardware resource or a software resource used to execute the microservice and the task, and an operating state of a sidecar of the microservice during the task;
accessing one or more policies established for the microservice;
analyzing the provenance metadata with respect to the one or more policies to identify if there is a violation of the one or more policies; and
generating one or more evaluation metrics based on whether the violation of the one or more policies is identified.

12. The method of claim 11, further comprising causing the local blockchain of provenance metadata to be available in a trust broker along with other blockchain of provenance metadata for the service.

13. The method of claim 11, wherein the provenance metadata comprises a data structure comprising the identification of the microservice, the operating state of the at least one of the hardware resource or the software resource used to execute the microservice and the task, and operating state of the sidecar of the microservice during the task.

14. The method of claim 11, further comprising providing a trusted execution environment (TEE) for a controller of the service to generate the provenance metadata and to encrypt the provenance metadata.

15. The method of claim 11, wherein the provenance metadata is generated by the microservice by:
obtaining provisioned credentials for the microservice based on an attestation protocol;
generating, for the task, the provenance metadata for the task;
encrypting the provenance metadata with the provisioned credentials for the microservice; and
recording the encrypted provenance metadata in the local blockchain.

16. A system comprising:
A memory; and
A processing device to execute a hypervisor hosting a microservice container, wherein the microservice container is execute a microservice of a service and is to:
obtain provenance metadata for a microservice from a local blockchain of provenance metadata maintained for a hardware resource executing a task performed by the microservice, the provenance metadata comprising identification of the microservice, operating state of at least one of the hardware resource or a software resource used to execute the microservice and the task, and an operating state of a sidecar of the microservice during the task;

access one or more policies established for the microservice;

analyze the provenance metadata with respect to the one or more policies to identify if there is a violation of the one or more policies; and generate one or more evaluation metrics based on whether the violation of the one or more policies is identified.

17. The system of claim 16, wherein the microservice is further to cause the local blockchain of provenance metadata to be available in a trust broker along with other blockchain of provenance metadata for the service.

18. The system of claim 16, wherein the provenance metadata comprises a data structure comprising the identification of the microservice, the operating state of the at least one of the hardware resource or the software resource used to execute the microservice and the task, and operating state of the sidecar of the microservice during the task.

19. The system of claim 16, wherein the processing device is to provide a trusted execution environment (TEE) for a controller of the service to generate the provenance metadata and to encrypt the provenance metadata.

20. The system of claim 16, wherein the provenance metadata is generated by the microservice by:

obtaining provisioned credentials for the microservice based on an attestation protocol;

generating, for the task, the provenance metadata for the task;

encrypting the provenance metadata with the provisioned credentials for the microservice; and recording the encrypted provenance metadata in the local blockchain.

* * * * *